(12) United States Patent
Reisman et al.

(10) Patent No.: US 7,142,699 B2
(45) Date of Patent: Nov. 28, 2006

(54) FINGERPRINT MATCHING USING RIDGE FEATURE MAPS

(75) Inventors: James G. Reisman, Plainsboro, NJ (US); Arun Ross, East Lansing, MI (US)

(73) Assignee: Siemens Corporate Research, Inc., Princeton, NJ (US)

( * ) Notice: Subject to any disclaimer, the term of this patent is extended or adjusted under 35 U.S.C. 154(b) by 735 days.

(21) Appl. No.: 10/309,657

(22) Filed: Dec. 4, 2002

(65) Prior Publication Data

US 2003/0169910 A1  Sep. 11, 2003

Related U.S. Application Data

(60) Provisional application No. 60/340,345, filed on Dec. 14, 2001.

(51) Int. Cl.
*G06K 9/00* (2006.01)
*G06K 9/62* (2006.01)
*G05B 19/00* (2006.01)
*B42D 15/00* (2006.01)

(52) U.S. Cl. ............ 382/124; 382/209; 340/5.83; 283/69

(58) Field of Classification Search .......... 382/124
See application file for complete search history.

(56) References Cited

U.S. PATENT DOCUMENTS

| | | | | |
|---|---|---|---|---|
| 3,565,565 A | * | 2/1971 | Reid | 356/71 |
| 4,151,512 A | * | 4/1979 | Riganati et al. | 382/125 |
| 5,031,226 A | * | 7/1991 | Delange | 382/199 |
| 5,065,431 A | * | 11/1991 | Rollett | 704/243 |
| 5,631,971 A | * | 5/1997 | Sparrow | 382/125 |
| 5,790,710 A | * | 8/1998 | Price et al. | 382/255 |
| 6,002,499 A | * | 12/1999 | Corboline et al. | 359/2 |
| 6,038,666 A | * | 3/2000 | Hsu et al. | 713/186 |
| 2003/0039382 A1 | * | 2/2003 | Yau et al. | 382/125 |

OTHER PUBLICATIONS

Anil K. Jain, et al. "Filterbank-Based Fingerprint Matching" IBM T.). Watson Research Center, pp. 1-30.

* cited by examiner

*Primary Examiner*—Joseph Mancuso
*Assistant Examiner*—Kathleen Yuan
(74) *Attorney, Agent, or Firm*—Donald B. Paschburg; F. Chau & Associates, LLC

(57) ABSTRACT

A method for matching fingerprint images is provided. The method includes the steps of acquiring a query image of a fingerprint; extracting a minutiae set from the query image; comparing the minutiae set of the query image with a minutiae set of at least one template image to determine transformation parameters to align the query image to the at least one template image and to determine a minutiae matching score; constructing a ridge feature map of the query image; comparing the ridge feature map of the query image to a ridge feature map of the at least one template image to determine a ridge feature matching score; and combining the minutiae matching score with the ridge feature matching score resulting in an overall score, the overall score being compared to a threshold to determine if the query image and the at least one template image match.

16 Claims, 8 Drawing Sheets

FINGERPRINT MATCHING USING RIDGE FEATURE MAPS

PRIORITY

This application claims priority to an application entitled "FINGERPRINT MATCHING USING FEATURE SPACE CORRELATION" filed in the United States Patent and Trademark Office on Dec. 14, 2001 and assigned Ser. No. 60/340,345, the contents of which are hereby incorporated by reference.

BACKGROUND OF THE INVENTION

1. Field of the Invention

The present invention relates generally to image processing, and more particularly, to a system and method for matching fingerprint images.

2. Description of the Related Art

Among all biometric indicators, fingerprints have one of the highest levels of reliability and have been extensively used by forensic experts in criminal investigations. Although not scientifically established, fingerprints are believed to be unique across individuals, and across fingers of the same individual. Even identical twins having similar DNA, are believed to have different fingerprints. These observations have led to the increased use of automatic fingerprint-based identification systems in both civilian and law-enforcement applications.

The uniqueness of a fingerprint 10 is determined by the topographic relief of its ridge structure and the presence of certain ridge anomalies termed as minutiae points, e.g., ridge endings 12 and ridge bifurcations 14 as shown in FIG. 1. Typically, a global configuration defined by the ridge structure is used to determine the class of the fingerprint, while the distribution of minutiae points is used to match and establish the similarity between two fingerprints. Automatic fingerprint identification systems, that match a query print against a large database of prints (which can consist of millions of prints), rely on the pattern of ridges in the query image to narrow their search in the database (fingerprint indexing), and on the minutiae points to determine an exact match (fingerprint matching). The ridge flow pattern is seldom used for matching fingerprints.

Fingerprint matching techniques can be broadly classified as being minutiae-based or correlation-based. Minutiae-based techniques attempt to align two sets of minutiae points and determine the total number of matched minutiae. Correlation-based techniques, on the other hand, compare the global pattern of ridges and furrows to see if the ridges in the two fingerprints align. The performance of minutiae-based techniques rely on the accurate detection of minutiae points and the use of sophisticated matching techniques to compare two minutiae fields which undergo non-rigid transformations. The performance of correlation-based techniques is affected by non-linear distortions and noise present in the image. In general, it has been observed that minutiae-based techniques perform better than correlation-based ones.

In the prior art, a representation scheme has been proposed that captures global and local features of a fingerprint in a compact fixed length feature vector termed as FingerCode. (See A. K. Jain, S. Prabhakar, L. Hong, S. Pankanti, "Filterbank-based fingerprint matching," IEEE Transactions on Image Processing 9 (5) (2000) pp. 846–859.) This technique makes use of the texture features available in a fingerprint to compute the feature vector. This scheme for generic representation of oriented texture relies on extracting a core point 16 in the fingerprint. A circular region around the core point 16 is located and tessellated into sectors as shown in FIG. 2(a). The pixel intensities in each sector are normalized to a constant mean and variance, and filtered using a bank of 8 Gabor filters to produce a set of 8 filtered images. Gray scale variance within a sector quantifies the underlying ridge structures and is used as a feature. A feature vector is the collection of all the features, computed from all the sectors, in every filtered image. The FingerCode captures the local information, and the ordered enumeration of the tessellation captures the invariant global relationships among the local patterns. The matching stage simply computes the Euclidean distance between the two corresponding FingerCodes. This technique, however, suffers from the following shortcomings: (i.) The frame of reference is based on a global singular point (i.e., the core point). Detection of the core point is non-trivial; furthermore, the core point may not even be present in small-sized images obtained using solid-state sensors; (ii.) The alignment is based on a single reference point and is, therefore, not very robust with respect to errors in the location of the reference point; and (iii.) The tessellation does not cover the entire image. Furthermore, if the core were to be detected close to a boundary of the image, the tessellation will include only an extremely small portion of the image (FIG. 2(b)).

SUMMARY OF THE INVENTION

Most fingerprint matching systems rely on the distribution of minutiae on a fingertip to represent and match fingerprints. While a ridge flow pattern is generally used for classifying fingerprints, it is seldom used for matching. The present invention provides a fingerprint matching method that uses ridge flow information to represent and match fingerprints. A set of 8 Gabor filters, whose spatial frequencies correspond to the average inter-ridge spacing in fingerprints, is used to capture ridge strength at equally spaced orientations of a fingerprint image. A square tessellation of the filtered images is then used to construct an eight-dimensional feature map, called a ridge feature map. The ridge feature map of a query fingerprint is then aligned with a template fingerprint for matching purposes.

According to one aspect of the present invention, a method for matching fingerprint images is provided. The method includes the steps of acquiring a query image of a fingerprint; extracting a minutiae set from the query image; comparing the minutiae set of the query image with a minutiae set of at least one template image to determine transformation parameters to align the query image to the at least one template image and to determine a minutiae matching score; constructing a ridge feature map of the query image; comparing the ridge feature map of the query image to a ridge feature map of the at least one template image to determine a ridge feature matching score; and combining the minutiae matching score with the ridge feature matching score resulting in an overall score, the overall score being compared to a threshold to determine if the query image and the at least one template image match.

According to another aspect of the present invention, a system for matching fingerprint images is provided including a fingerprint input device for acquiring a query image of a fingerprint; and a processor for extracting a minutiae set from the query image, comparing the minutiae set of the query image with a minutiae set of at least one template image to determine transformation parameters to align the query image to the at least one template image and to determine a minutiae matching score, constructing a ridge feature map of the query image, comparing the ridge feature map of the query image to a ridge feature map of the at least one template image to determine a ridge feature matching score, and combining the minutiae matching score with the ridge feature matching score resulting in an overall score, the overall score being compared to a threshold to determine if the query image and the at least one template image match.

According to a further aspect of the present invention, a method for matching fingerprint images includes the steps of acquiring a query image of a fingerprint; constructing a ridge feature map of the query image; aligning the ridge feature map of the query image to a ridge feature map of at least one template image; comparing the ridge feature map of the query image to the ridge feature map of the at least one template image to determine a ridge feature matching score; and comparing the ridge feature matching score to a threshold to determine if the query image and the at least one template image match.

BRIEF DESCRIPTION OF THE DRAWINGS

The above and other aspects, features, and advantages of the present invention will become more apparent in light of the following detailed description when taken in conjunction with the accompanying drawings in which.

DETAILED DESCRIPTION OF PREFERRED EMBODIMENTS

Figure 1:
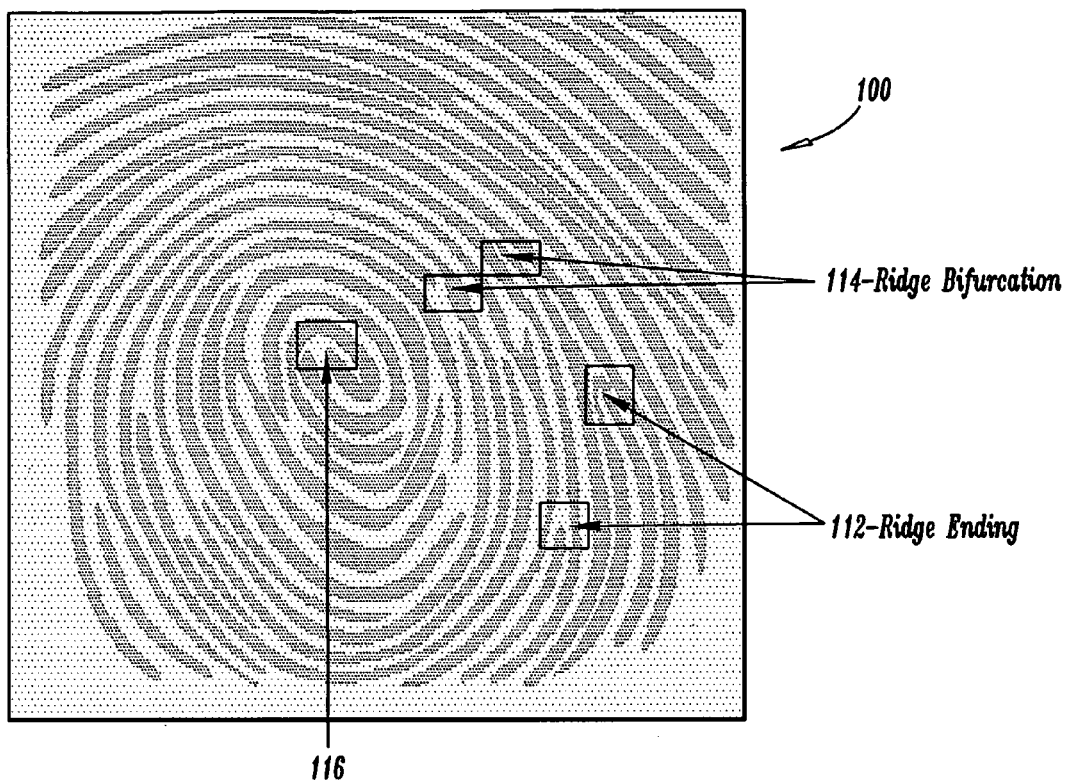
FIG. 1 is a drawing of a fingerprint illustrating a core and minutiae of the fingerprint.

Preferred embodiments of the present invention will be described hereinbelow with reference to the accompanying drawings. In the following description, well-known functions or constructions are not described in detail to avoid obscuring the invention in unnecessary detail.

A ridge pattern in a fingerprint may be viewed as an oriented texture pattern having a fixed dominant spatial frequency and orientation in a local neighborhood. The frequency is due to the inter-ridge spacing present in the fingerprint, and the orientation is due to the flow pattern exhibited by the ridges. Most fingerprints have the same inter-ridge spacing over the entire print; moreover, it has been observed that fingerprints from different fingers have almost the same inter-ridge spacing and, consequently, the frequency characteristic of the fingerprint may be assumed to be the same for all prints. By capturing the frequency and orientation of ridges in non-overlapping local regions in the fingerprint, a distinct representation of the fingerprint is possible. However, to match two fingerprints using such a representation, a suitable alignment of the underlying ridge structures is essential.

According to an embodiment of the present invention, a fingerprint representation method is provided that constructs a ridge feature map by observing the local ridge orientation in a fingerprint image. The local ridge characteristics are extracted via a set of Gabor filters that are pre-tuned to a specific frequency corresponding to the average inter-ridge spacing in a fingerprint image. An input or query fingerprint image is filtered using this set of Gabor filters; a square tessellation is then applied to each filtered image to examine the local response to the filter; a feature vector which measures the energy in the filtered images for each of the tessellated cells is next obtained. A collection of these feature vectors (over the tessellation) constitutes the ridge feature map used to represent a fingerprint. Fingerprint matching entails determining the similarity between two such ridge feature maps after the maps have been properly aligned. In another embodiment, the ridge feature maps are used along with a minutiae set of a query fingerprint image for alignment and matching purposes.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), a read only memory (ROM) and input/output (I/O) interface(s) such as keyboard, cursor control device (e.g., a mouse) and display device. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device. Furthermore, a scanner device, for example an optical fingerprint scanner, a capacitance fingerprint scanner or any known device for capturing a fingerprint image, may be coupled to the machine for collecting image data.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 3:
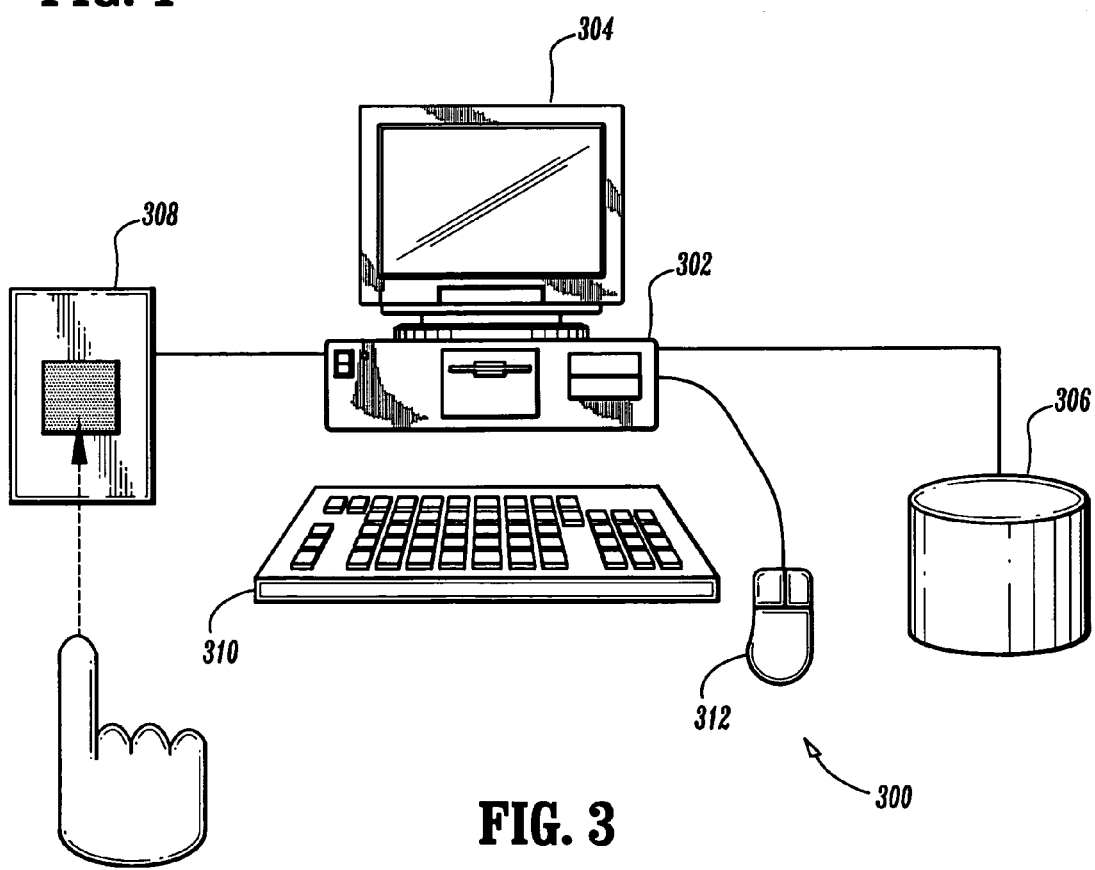
FIG. 3 is an exemplary system for fingerprint matching according to an embodiment of the present invention.
Figure 2A:
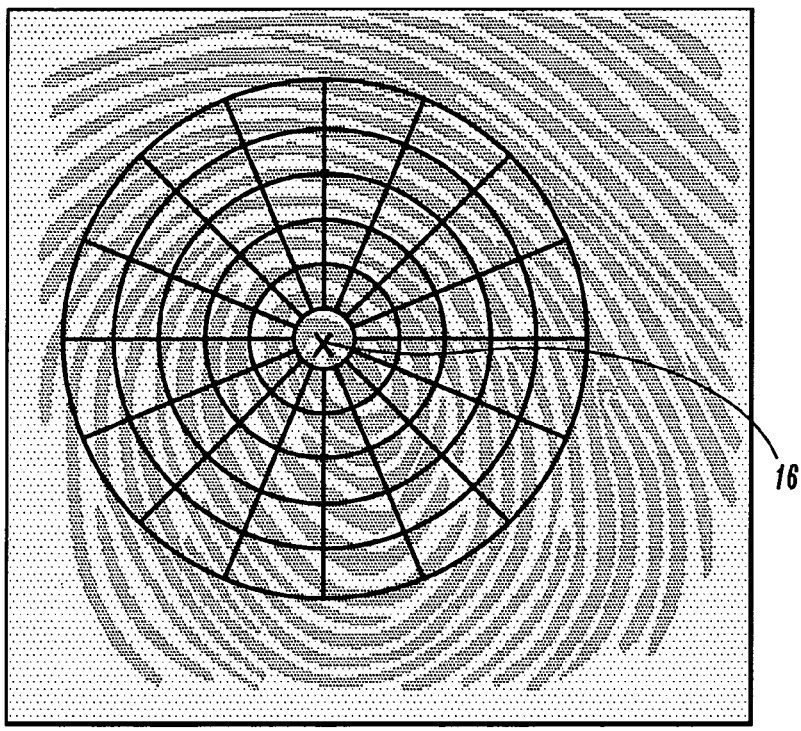
FIGS. 2(a) and (b) illustrate tessellating a fingerprint about a core using a circular gird according to a conventional fingerprint matching scheme.
Figure 2B:
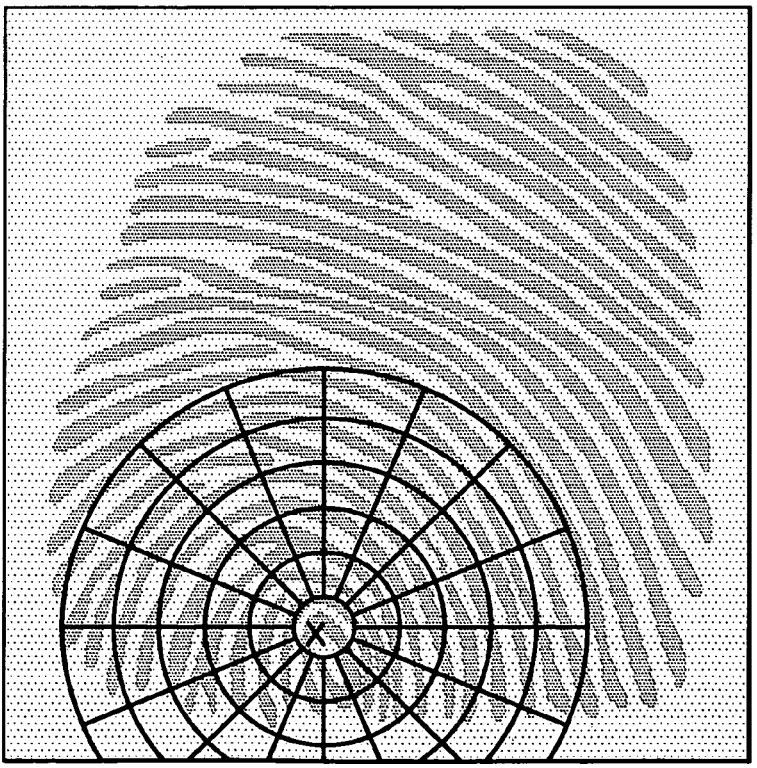

Referring to FIG. 3, an exemplary system 300 for fingerprint matching according to an embodiment of the present invention is provided. The system includes a processor 302 for extracting minutiae and constructing a ridge feature map from a query fingerprint image and for matching the query fingerprint image to a template fingerprint image and a display 304 for showing a result of the match. The system 300 includes a database 306 for storing template fingerprint images which may be collected prior to performing the matching process, e.g., during an enrollment period. The system further includes a fingerprint scanning device 308 for collecting query fingerprint images. The fingerprint scanning device may be a optical fingerprint scanner, a digital fingerprint scanner, a capacitance fingerprint scanner, a thermal fingerprint scanner, an ultrasonic fingerprint scanner or any other known device which creates an image of a fingerprint. Additionally, the system 300 may include a variety of input/output devices such as a keyboard 310 and mouse 312.

Figure 4:
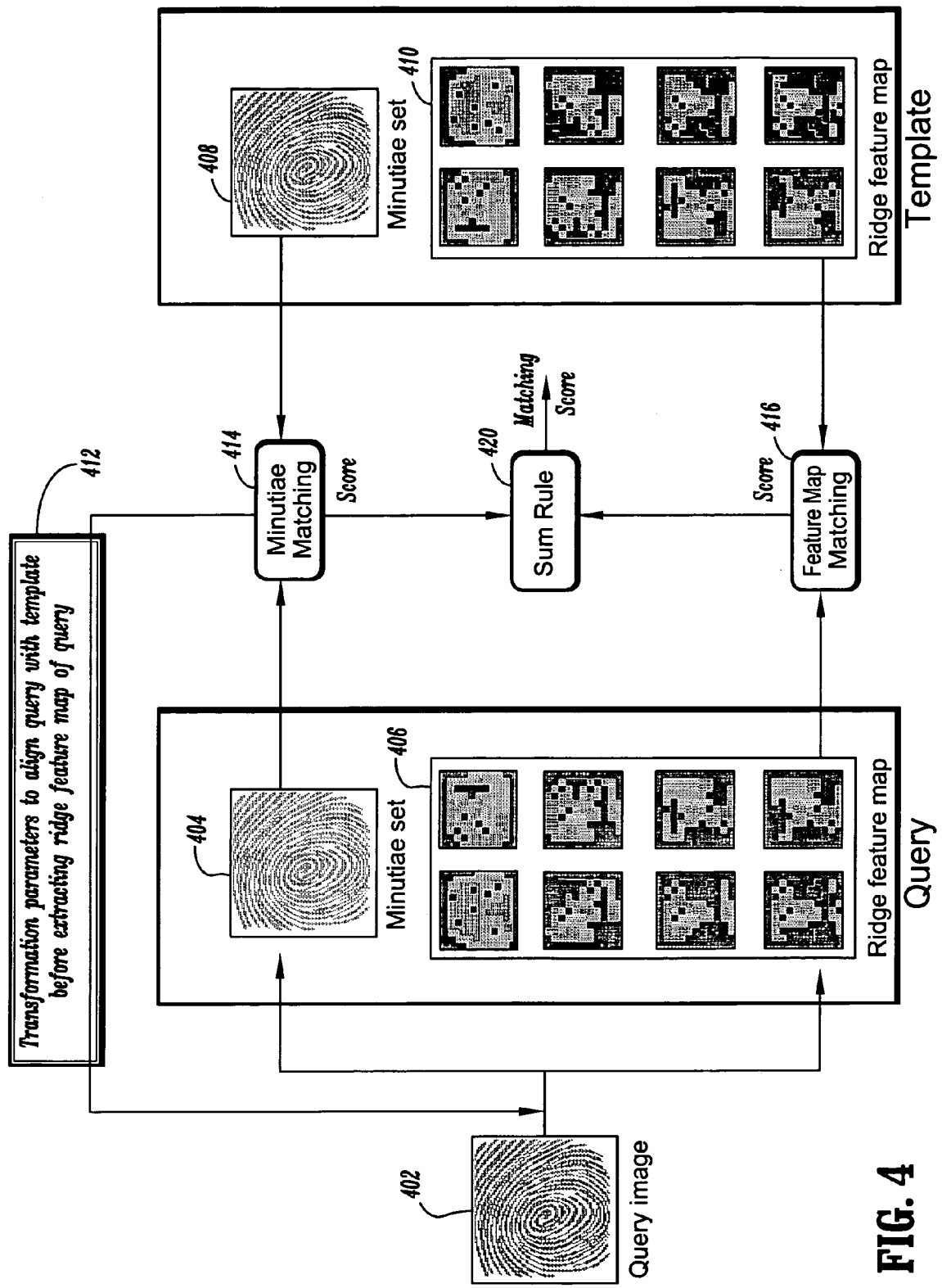
FIG. 4 is a general flow diagram illustrating a method for fingerprint matching according to an embodiment of the present invention.

Referring to FIG. 4, a general flow diagram of a method for fingerprint matching is provided. A query image Q 402 of a fingerprint is acquired via the fingerprint scanning device 308. The query image 402 is then processed to extract a minutiae set $M^Q$ 404 from the query image 402. The minutiae set 404 of the query image is compared to a minutiae set $M^T$ of a template image to determine transformation parameters 412 to be used to align the query image with the template image. The aligned query image is then processed to construct a ridge feature map 406 $R^Q$. The minutiae sets' 404, 408 of the query and template images, respectively, are matched to determine a minutiae matching score $S^M$ 414. Similarly, the ridge feature maps 406, 410 of the query and template images, respectively, are matched to determine a feature map matching score $S^R$ 416. The two scores 414, 416 are then combined by a predetermined sum rule to determine an overall matching score 420. If the overall matching score is greater than or equal to a predetermined threshold, it is determined that the query image and template image are from the same individual; otherwise, the system will indicate the query and template image do not match.

Figure 5:
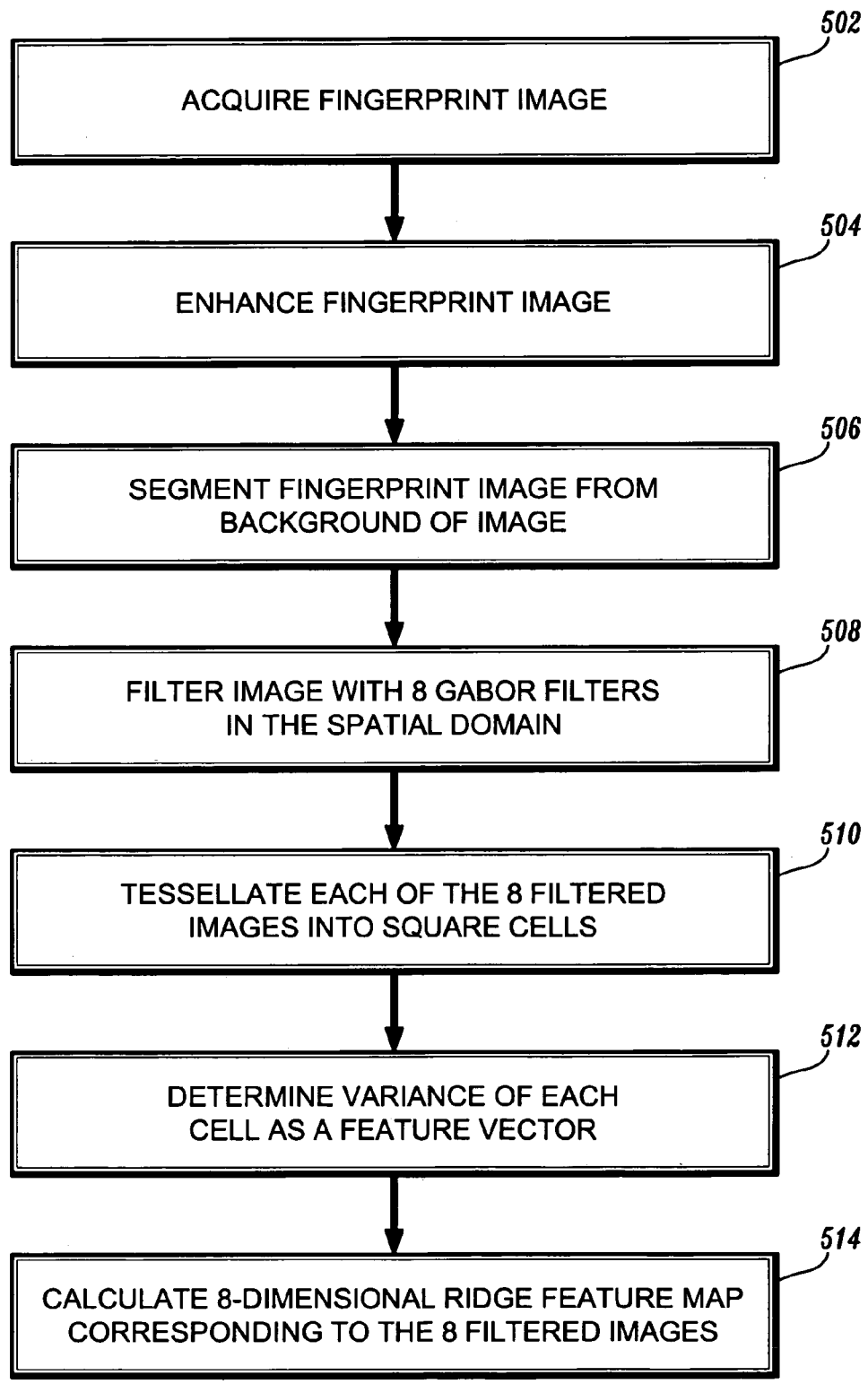
FIG. 5 is a flowchart illustrating a method for constructing a ridge feature map according to an embodiment of the present invention.
Figure 6:
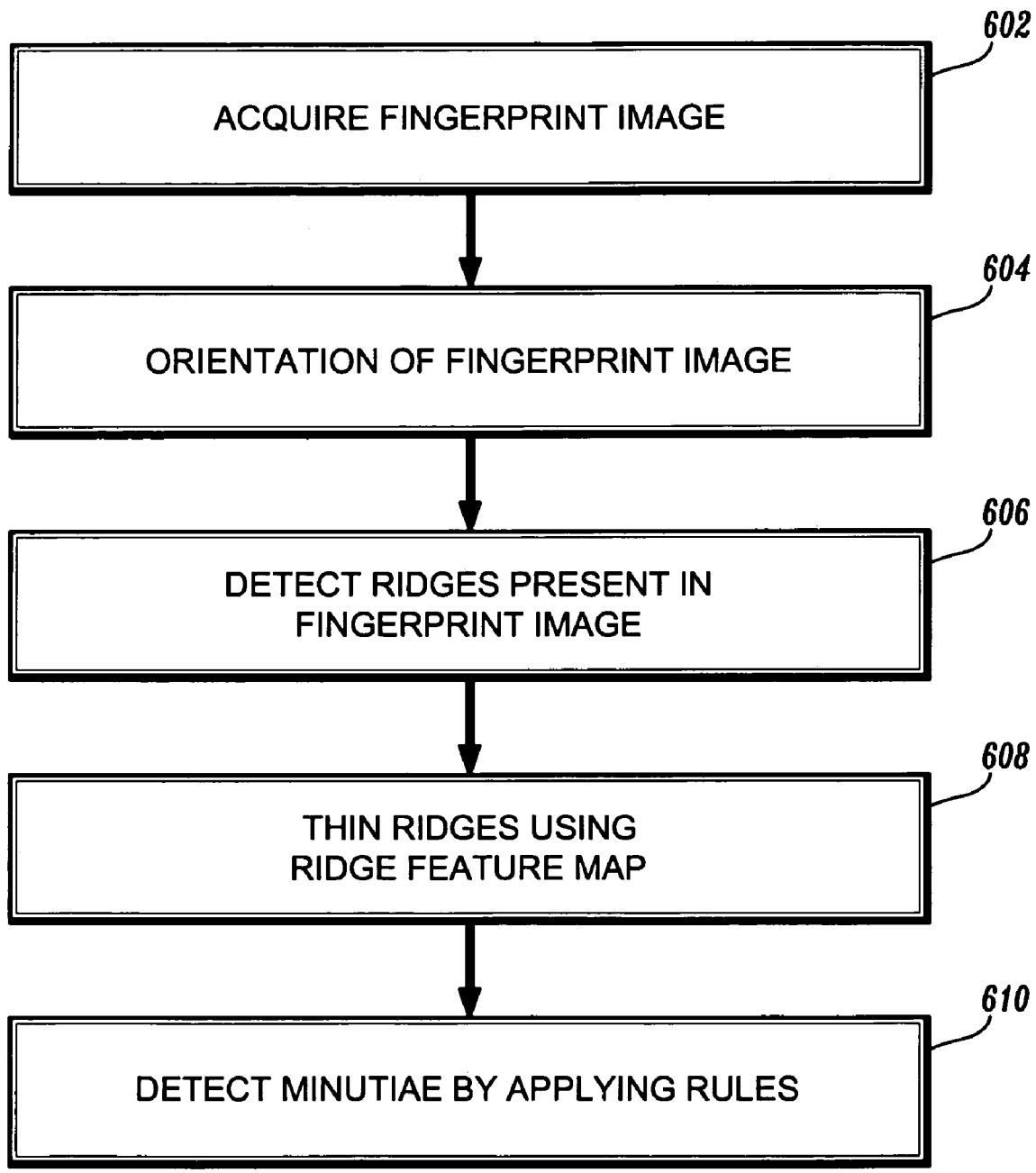
FIG. 6 is a flowchart illustrating a method for extracting minutiae of a fingerprint according to an embodiment of the present invention.

Referring to FIGS. 5 and 6, a detail description will now be provided for a method for constructing a ridge feature map and for detecting a minutiae set of a fingerprint image. It is to be understood that the ridge feature map and minutiae set will be derived in the same manner for both the query image and the template image.

Referring to FIG. 5, a flow chart illustrating a method for constructing a ridge feature map according to an embodiment of the present invention is provided. Initially, a fingerprint image is acquired (step 502). The image may be acquired by an individual placing a finger on a fingerprint scanning device or may be inputted into the system as an image file from an external system.

Once the fingerprint image is acquired, the fingerprint image is enhanced (step 504). Enhancement is the process by, which the clarity of the ridge and furrow structures in the fingerprint images is improved to facilitate the feature extraction process. Fingerprint enhancement helps in reducing the noise content in the fingerprint image. Enhancement, however, can also introduce false ridges, resulting in spurious or missing minutiae points. Since the ridge feature map representation of the present invention relies on dominant ridge directions in each tessellated cell of a fingerprint image, the introduction of false ridges is not a serious problem. The enhancement algorithm is provided below:

1. Let I be an N×N pixel input image that has to be enhanced, where I(x,y) is the intensity at pixel (x,y). The intensities are normalized so that they have a pre-specified mean and variance. The normalized image is denoted as J.

2. An orientation image O is obtained from J by computing gradients at each pixel (x,y). Thus O(x,y) specifies the ridge orientation at (x,y)

3. The frequency image, F, is obtained using J and O. F(x,y) corresponds to the ridge frequency at (x,y).

4. A region mask is applied to J to identify recoverable and irrecoverable blocks, where a recoverable block is defined as a rectangular region of the fingerprint image in which the image quality is sufficient to recover the underlying fingerprint ridge structure.

5. A bank of Gabor filters tuned to the local ridge orientation and frequency is applied to J to obtain an enhanced fingerprint image, H.

After the image is enhanced, the fingerprint image will be segmented from the background of the image (step 506). The ridge feature map is constructed using the feature values computed at each tessellated cell. Certain cells may predominantly contain background information, and therefore, the feature values computed at these cells will not be an accurate indication of ridge strength. Thus, the purpose of segmentation is to separate the foreground and background regions in a given fingerprint image. The foreground corresponds to those regions in the image that have relevant fingerprint information (i.e., the ridges and valleys of the fingerprint), while the background represents those regions that do not have relevant information. Cells with predominantly background information are not used during the matching stage. Segmentation is done by observing the local variation of intensity on the original gray-scale image.

The algorithm to segment a fingerprint image is as follows:

1. The intensity of the input fingerprint image is normalized to the range [0,1]. Such a normalization ensures that the effect of any rapid changes in intensity over the image is normalized.

2. The image is binarized by selecting a threshold that corresponds to one-half of the mean of the normalized image intensity.

3. A 3×3 median filter is applied to the binarized image. This operation removes any undesirable "salt-and-pepper" noise that may be present in the binarized image.

4. A conventional edge detection algorithm is then applied to the binary image to get the outline of ridges.

Once the enhanced image is segmented, the image is filtered using eight (8) Gabor filters (step 508). A two-dimensional (2D) Gabor filter can be thought of as a complex plane wave modulated by a 2D Gaussian envelope. These filters optimally capture both local orientation and frequency information and their development was motivated by observing the linear response of the receptive field in simple striate cortex cells. They are optimal in the sense that they try to minimize simultaneously the joint space-spatial frequency uncertainty. By tuning a Gabor filter to a specific frequency and direction, the local frequency and orientation information can be obtained. Thus, they are suited for extracting texture information from images.

An even symmetric Gabor filter has the following general form in the spatial domain:

$$G_{\theta,f}(x,y) = \exp\left\{\frac{-1}{2}\left[\frac{x'^2}{\delta_x^2} + \frac{y'^2}{\delta_y^2}\right]\right\}\cos(2\pi f x'), \quad (1)$$

$$x' = x\sin\theta + y\cos\theta,$$

$$y' = x\cos\theta - y\sin\theta,$$

where f is the frequency of the sinusoidal plane wave at an angle θ with the x-axis, and $\delta_x$ and $\delta_y$ are the standard deviations of the Gaussian envelope along the x and y axes, respectively.

For extracting the response of the ridge at various orientations of the Gabor filter, the parameters (f,$\delta_x$,$\delta_y$,θ) are set to the following values:

(i) The frequency, f, corresponds to the inter-ridge distance in fingerprint images. For a 300×300 (500 dpi) images, resized to 256×256, the average inter-ridge spacing is about 8 pixels. Hence, f=⅛=0.125.

(ii) The selection of the standard deviation values, $\delta_x$ and $\delta_y$, involves a trade-off. Larger values are more robust to noise, but will not capture ridge information at a fine level. Smaller values, on the other hand, are less robust to noise in the image, but capture ridge information very well. Based on empirical data, both these values were set to 4, i.e., $\delta_x$=$\delta_y$=δ=4.

(iii) Eight different orientations are examined. These correspond to θ values of 0°, 22.5°, 45°, 67.5°, 90°, 112.5°, 135°, 157.5°.

(iv) The filter size is set to 30. Filter values beyond a 30×30 region are very close to 0 for all 8 orientations.

These parameters are fixed during the matching process, allowing for pre-storing the Gabor filter representations in a lookup table referred to as the Gabor filter bank. This filter bank precalculates the Fourier representation of the Gabor filter for all orientations of interest. This formulation substantially improves the matching time in a one-to-many matching scheme.

Filtering requires convolving the enhanced image, H, with each of the 8 Gabor filters in the spatial domain. However, such a process would be extremely slow. For example, a 256×256 image that is convolved with a 16×16 filter, would result in approximately $10^7$ multiplications (assuming that the convolution operation has not been optimized). To speed-up this operation, the convolution is performed in the frequency domain. Let F(H) denote the discrete Fourier transform of H, and let F(G)$_θ$ indicate the discrete Fourier transform of the Gabor filter having the spatial orientation θ. Thus, the Gabor filtered image, $V_θ$, may be obtained as, $$V\theta = F^{-1}[F(H)F(G_\theta)], \quad (2)$$

where $F^{-1}$ is the inverse Fourier transform. Eight filtered images are obtained as a result of this filtering.

While a filtered image in its entirety can be used as a representation scheme, the presence of local distortions would affect the matching process drastically. Moreover, it is the local variations in ridge structure (combined with the global ridge configuration) that provide a better representation of the fingerprint. To examine local variations, the image is tessellated into square cells (step 510), and features from each of the cells are computed (step 512).

The size of a cell is chosen to correspond to approximately the width of two ridges (16×16). This results in $n_c$=15 cells in each row and column of the square grid. The total number of tessellated cells over the image is, therefore, $N_c$=225. The variance of the pixel intensities in each cell across all filtered images is used as a feature vector. The variance corresponds to the energy of the filter response, and is, therefore, a useful measure of ridge orientation in a local neighborhood. Those tessellated cells that contain a certain proportion of background pixels are labeled as background cells and the corresponding feature value is set to 0.

In defining a ridge feature map, let $C_θ(i,j)$ refer to the (i,j)th cell in the square grid that is placed on the filtered image $V_θ$. The variance, $\sigma_θ^2(i,j)$, represents the feature value corresponding to the cell. Thus, for each $V_θ$, a feature map of variance values can be obtained. Let $R_θ$ denote the feature map associated with the filtered image $V_θ$. Then, $$R_\theta = \{\sigma_\theta^2(i,j)\} \quad (3)$$

where, θ∈{0°, 22.5°, 45°, 67.5°, 90°, 112.5°, 135°, 157.5°}, i=1 . . . $n_c$, j=1. . .$n_c$.

An eight-dimensional feature map corresponding to the 8 filtered images is obtained in this way. These ridge feature maps are used to represent and match a query image with a template.

Referring to FIG. 6, a method for extracting minutiae of a fingerprint according to an embodiment of the present invention is provided. Minutiae extraction refers to the process by which the minutiae points are detected in a fingerprint image after it has been acquired (step 602). Each minutiae is characterized by its (x,y) location in the image, and the orientation • of the ridge on which it is detected. The ridge information in a 64×64 region around the (x,y) point is associated with every minutiae which is useful when two minutiae sets are being matched. The minutiae extraction scheme can be broadly classified into the following stages:

(i) Orientation Field Estimation (step 602): The orientation of the fingerprint image is computed in non-overlapping blocks by examining the gradients of pixel intensities in the x and y directions within the block.

(ii) Ridge Detection (step 606): The ridges present in the fingerprint image are identified by applying masks that are capable of accentuating the local maximum gray level values along the normal direction of the local ridge direction.

(iii) Ridge Thinning (step 608): The ridge map constructed earlier is used to obtain a thinned ridge image.

(iv) Minutiae Detection (610): A set of rules is applied to the thinned ridges to label minutiae points (e.g., ridge endings and ridge bifurcations). A thinned ridge image is constructed such that the remaining ridge points have only one, two, or three (of the possible 8) neighboring ridge points. A ridge ending would be labeled as those points with only one neighboring ridge pixel, and a ridge bifurcation would be labeled as those ridge points with three neighboring ridge pixels As a postprocessing step, a conventional refinement algorithm is applied to remove spurious minutiae points.

Figure 7:
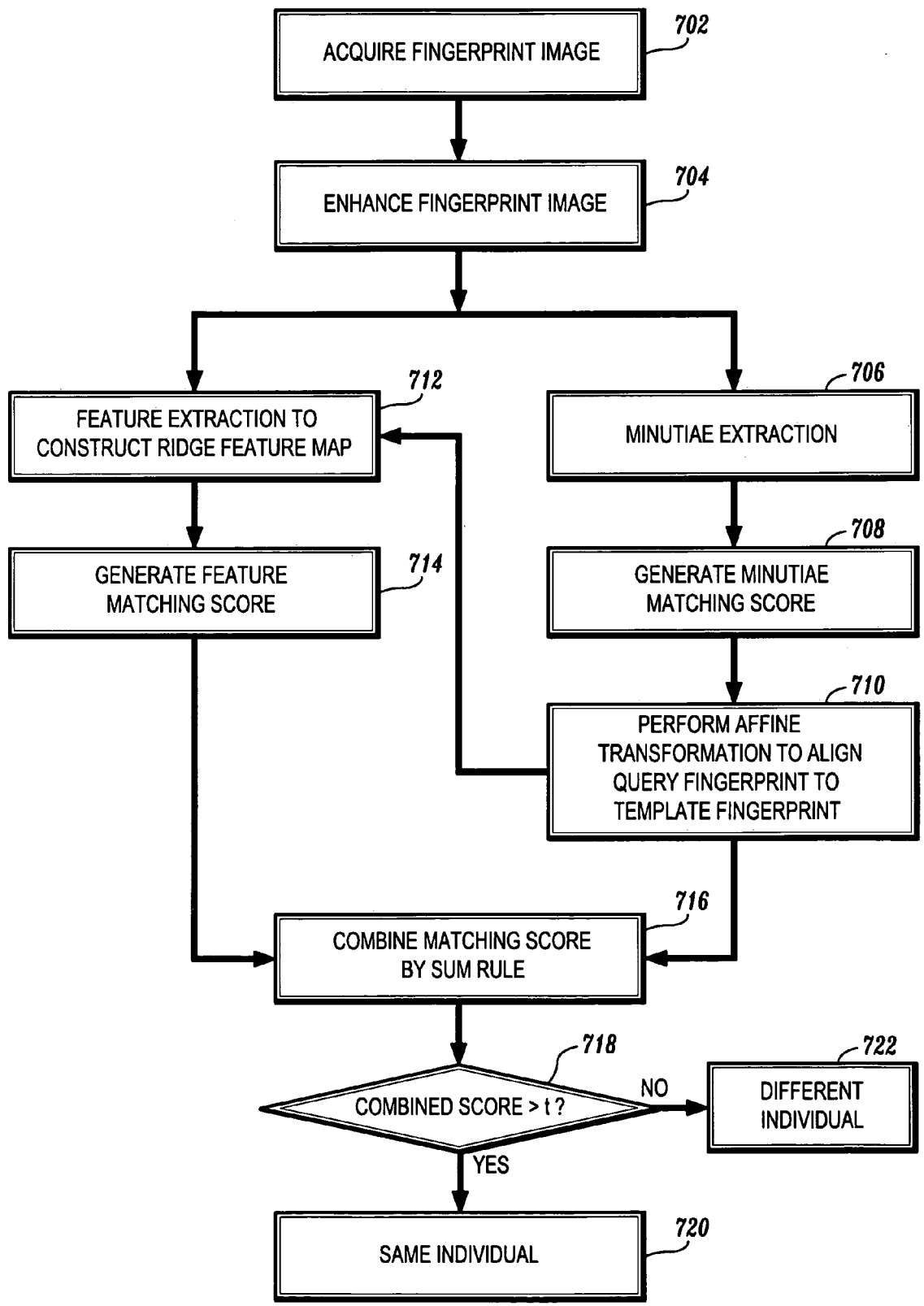
FIG. 7 is a flowchart illustrating the method of fingerprint matching according to an embodiment of the present invention.
Figure 8:
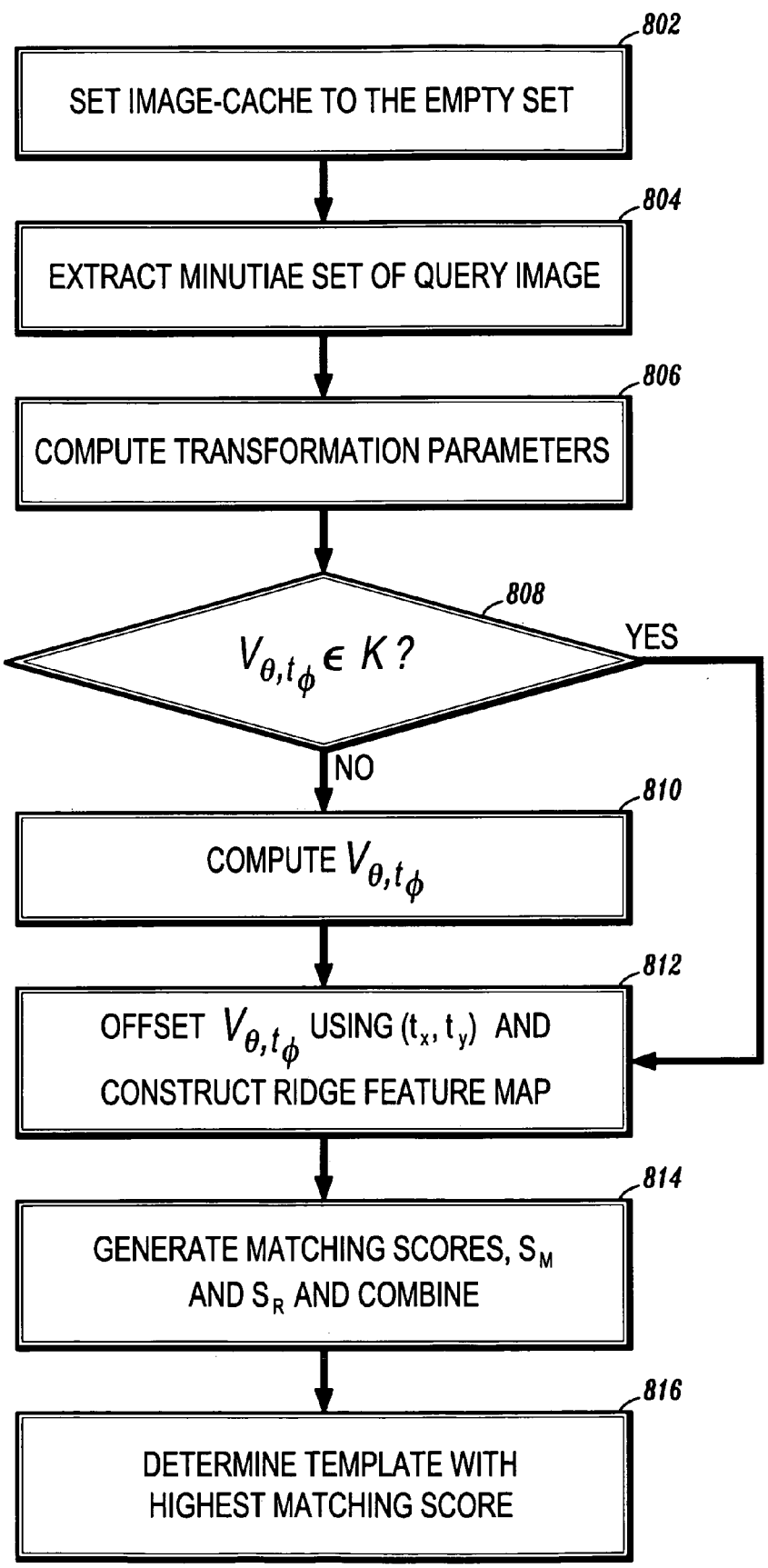
FIG. 8 is a flowchart illustrating a method of fingerprint identification according to an embodiment of the present invention.

Once the ridge feature map and minutiae set of an input image is determined, it is stored as a temple in the database 306 to be accessed during a fingerprint matching process with a query fingerprint. A detailed description of the fingerprint matching process will now be given in relation to FIG. 7.

The process of fingerprint matching involves comparing a query print with a set of one or more template prints. Prior to the matching process, feature information is extracted from all the template images as described above. The hybrid fingerprint matcher of an embodiment of the present invention utilizes two distinct sets of fingerprint information for matching fingerprints: minutiae features and ridge feature maps. When a query image is presented (step 702), the matching proceeds as follows: (i) the query and template minutiae features are matched (step 706) to generate a minutiae matching score (step 708) and transformation parameters (translation and rotation) that relate the query and template fingerprints (step 710); (ii) the rotation parameter is used to rotate the 8 Gabor filters and the modified filters are applied to the query image (step 712); (iii) the filtered query images are then translated and rotated according to the parameters; (iv) the ridge feature map is extracted from these filtered images; (v) the query and template ridge feature maps are matched and a matching score is generated (step 714); (vi) the minutiae and ridge feature map matching results are combined to generate a single matching score (step 716). The single matching score is then compared to a threshold, t, (step 718). If the single matching score is greater than the threshold, it is determined that the query fingerprint and the template fingerprint come from the same person (step 720); otherwise, if the matching score is lower than the threshold, it is determined the query fingerprint and template fingerprint are from different people (step 722).

Optionally, the query fingerprint may be enhanced after it is acquired (step 704).

Minutiae matching (step 708) involves a point matching operation on the two minutiae sets. A conventional elastic string matching technique is employed to compare the two minutiae sets. The output of the matching process is a matching score that indicates the similarity of the two sets being compared and a correspondence map that indicates pairing of minutiae points from the two sets. The correspondence map is used to compute the transformation parameters necessary to align the two fingerprint images.

The minutiae matching score is a measure of the similarity of the minutiae sets of the query and template images; the higher the matching score the better the match. The similarity score is normalized in the [0,100] range. The ridge feature maps of the query and the template images are compared by computing the sum of the Euclidean distances of the 8-dimensional feature vectors in the corresponding tessellated cells. Cells that are marked as background, are not used in the matching process. This results in a distance score measure; a higher distance score indicates a poor match. The distance score is normalized in the [0,100] range, and converted to a similarity score by simply subtracting it from 100.

For comparing the ridge feature maps of two images, it is necessary that the images themselves are aligned appropriately to ensure an overlap of common regions in the two fingerprint images. This is done by determining the transformation parameters, $(t_x, t_y, t_\theta)$ that would align the query image with the template (step 710). As indicated above, the correspondence map provided by the minutiae matcher is used to compute $(t_x, t_y, t_\theta)$.

Once the transformation parameters, $(t_x, t_y, t_\theta)$ are obtained, the query image can be aligned with the template. But rotating the query image will result in artifacts that may affect the subsequent filtering operation. To avoid this, appropriately rotated Gabor filters (which are also stored in the Gabor filter bank) are applied to the query image. The resulting filtered images are then rotated and feature values extracted. Let H represent the enhanced query image, and $(t_x, t_y, t_\theta)$ be the translation and rotation parameters obtained using the minutiae matching information. Then the filtered image, $V_{\theta, t_\phi}$, is obtained as, $$V_{\theta,t_\phi}=\text{Rot}_{t_\phi}F^{-1}[F(H)F(G_{\theta-t_\phi})], \quad (4)$$

where $\text{Rot}_{t_\phi}$ indicates that the filtered image is rotated by an angle $t_\phi$. The notation $V_{\theta,t_\phi}$ is used to indicate that the filtered image corresponding to filter orientation $\theta$ was rotated through an angle $t_\phi$. The filtered image is then translated by $(t_x, t_y)$, to ensure that the tessellation of the query image would overlap with that of the template.

The matching scores generated by comparing the minutiae sets and the ridge feature maps, are combined to generate a single matching score (step 718). Let $S_M$ and $S_R$ indicate the similarity scores obtained using minutiae matching and ridge feature map matching, respectively. Then, the final matching score, S, is computed as, $$S=\alpha S_M+(1-\alpha)S_R, \quad (5)$$

where $\alpha \in [0,1]$. It is possible to vary $\alpha$ to assign different weights to the individual matchers.

According to another embodiment of the present invention, a fingerprint identification method is provided. Fingerprint identification involves matching a query image against multiple templates (corresponding to different users) to determine the best matching score and, therefore, the template that best resembles it.

The processing time required to perform identification (one-to-many matching) is substantially more than that required for verification (one-to-one matching). To reduce the number of matching operations, most fingerprint identification systems use some indexing mechanism, to narrow the number of templates against which the query image has to be matched. However, in the identification method of the present invention, an indexing mechanism is not used to limit the number of matchings. The identification method requires filtering and rotating the query image for every match that is performed (Eq. (4)). Computing $V_{\theta,t_\phi}$ is an expensive operation because of the Fourier operations performed. To decrease the computational complexity involved, a combination of frequency domain filtering and filtered image-caching is done. Caching $V_{\theta,t_\phi}$ avoids recomputing this filtered image. Each time a query image, Q, is presented, the following method is performed:

Step 802: Let the image-cache be represented by K. Set K = • (the empty set).

Step 804: Extract the minutiae set of Q, $M^Q$. For all the templates $\{T_1\}$ in the database, represented by their minutiae set $\{M^{T_i}\}$ and ridge feature map $\{R^{T_i}\}$, perform steps 806 to 814.

Step 806: Compute the transformation parameters, $(t_x, t_y, t_\theta)$, relating Q and $T_1$, using the minutiae sets $M^Q$ and $M^{T_i}$ as described above.

Step 808: If $V_{\theta,t_\phi} \in K$, go to step 812, otherwise

Step 810: Compute $V_{\theta,t_\phi}$ according to Eq. (4). $K=K \cup V_{\theta,t_\phi}$ Step 812: Offset $V_{\theta,t_\phi}$ using $(t_x, t_y)$ and perform tessellation and ridge feature map extraction. Let $R^O$ be the ridge feature map of the query image.

Step 814: Use $M^Q, M^{T_1}, R^Q$ and $R^{T_1}$ to generate the matching scores $S_M$ and $S_R$. Combine scores using Eq. (5) to obtain a single matching score $S_1$.

Step 816: The template $T_1$ that results in the highest matching score is reported as the closest match to the query image Q.

Step 810 is performed only when $V_{\theta,t_\phi}$ has not been computed at an earlier stage, thus improving the speed of the one-to-many matching process.

A second embodiment of the present invention provides a novel fingerprint alignment and matching method that utilizes ridge feature maps to represent, align and match fingerprint images. The method of the second embodiment obviates the need for extracting minutiae points or the core point to either align or match fingerprint images. The method examines the ridge strength (in local neighborhoods of the fingerprint image) at various orientations, using a set of 8 Gabor filters, whose spatial frequencies correspond to the average inter-ridge spacing in fingerprints.

A standard deviation map corresponding to the variation in local pixel intensities in each of the 8 filtered images, is generated. The standard deviation map is sampled at regular intervals in both the horizontal and vertical directions, to construct the ridge feature map. The ridge feature map provides a compact fixed-length representation for a fingerprint image. When a query print is presented to the system, the standard deviation map of the query image and the ridge feature map of the template are correlated, in order to determine the translation offsets necessary to align them. Based on the translation offsets, a matching score is generated by computing the Euclidean distance between the aligned feature maps.

As described above, an acquired query image is convolved with 8 Gabor filters using Eq. (2). Each $V_\theta$ is used to construct a standard deviation image, $S_\theta$, where $S_\theta$ (x,y) represents the standard deviation of the pixel intensities in a 16×16 neighborhood of (x,y) in $V_\theta$.

The standard deviation map, $S=S_\theta$, comprises 8 images corresponding to the 8 filtered images. Thus, the standard deviation map, $S_\theta$, captures the variation in the ridge strength at various orientations. Each standard deviation image, $S_\theta$, is then sampled at regular intervals (every 16$^{th}$ pixel) in both the horizontal and vertical directions to obtain the ridge feature image, $R_\theta$. The ridge feature map, R
=$R_\theta$, is composed of these 8 images. The size of $R_\theta$(15×15) is lesser than that of $S_\theta$(240×240). Therefore, a compact fixed-length (15×15×8=1,800) representation for the fingerprint results.

Figure 9:
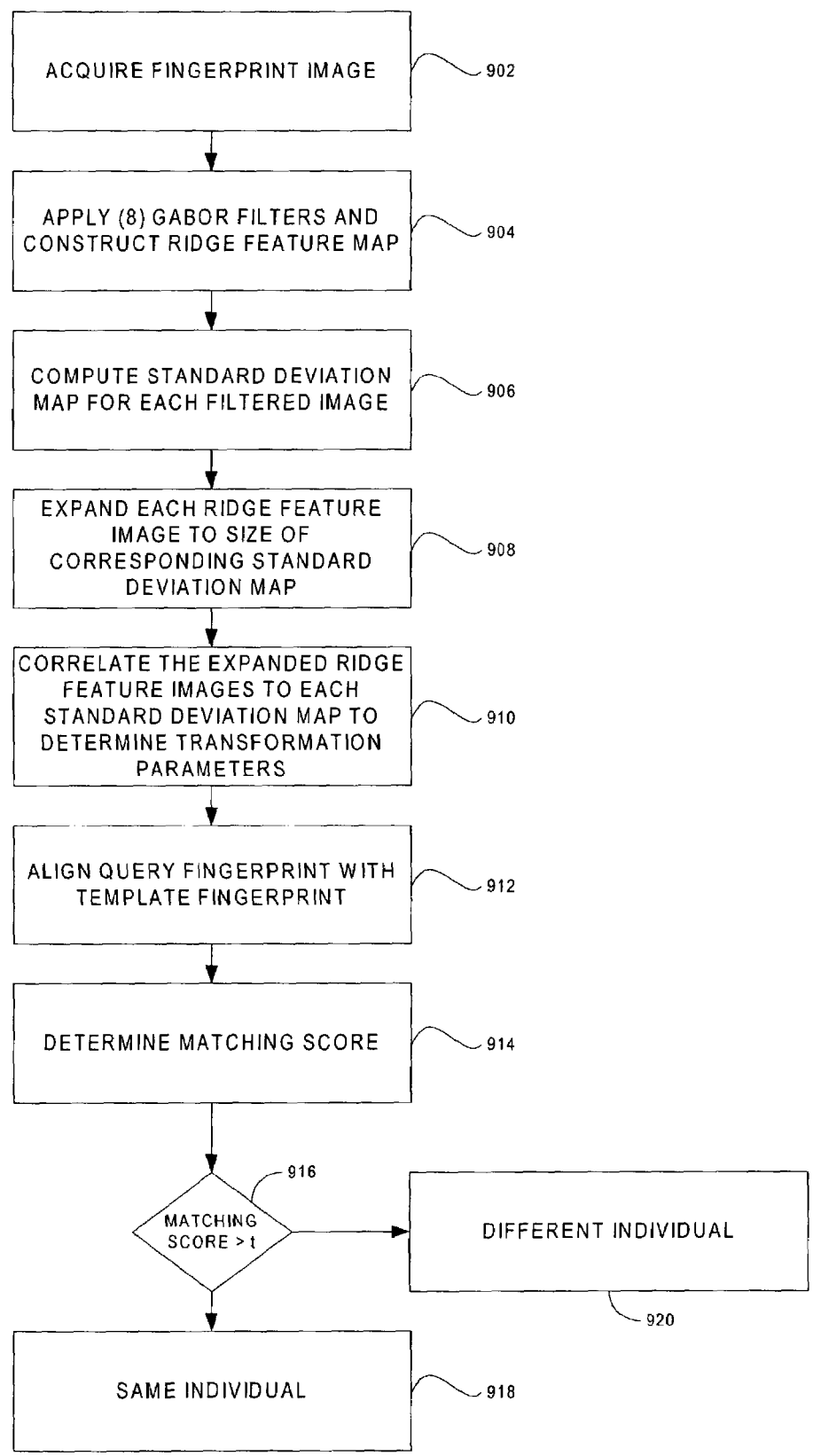
FIG. 9 is a flowchart illustrating the method of fingerprint matching according to another embodiment of the present invention.

Referring to FIG. 9, the fingerprint matching method of the second embodiment of the present invention involves comparing a query fingerprint with a set of one or more template fingerprints. Prior to the matching process, ridge feature maps are extracted from all template images present in the database. When a query fingerprint, Q, is presented to the system (step 902), it is matched against a template ridge feature map, $R^T=\{R_\theta^T\}$ as will be described below with reference to FIG. 9.

The query image is enhanced and the set of 8 Gabor filters is applied to the enhanced image, resulting in 8 filtered images (step 904). The standard deviation map, $S_\theta^Q$, for the query image is constructed using these filtered images (step 906). Each of the 8 template ridge feature images, $R_\theta^T$, is expanded to the size of $S_\theta^Q$ by interpolating with 0's (step 908). Let the ridge feature map consisting of the interpolated images be indicated by $S_\theta^T$.

To determine the alignment between $S_\theta^Q$ and $S_{74}^T$, a 2D correlation of the two maps is performed (step 910). Correlation involves multiplying corresponding entries in the two maps at all possible translation offsets, and determining the sum. The offset that results in the maximum sum is chosen to be the optimal alignment between the two maps. Correlation is done in the frequency domain, and every offset is appropriately weighted. The weighting is necessary to account for the amount of overlap between the two maps. Let $U_{TQ}$ represent the unweighted correlation matrix, and $C_{TQ}$ represent the weighted correlation matrix. Let N×N be the size of a standard deviation image (N=240). Then, $$U_{TQ} = \sum_\theta \{F^{-1}[F(S_\theta^Q)F(S_\theta^T)]\} \quad (6)$$

$$C_{TQ}(x,y) = \frac{U_{TQ}(x,y) * H * W}{(H-m_x)(W-n_y)}; x=1\cdots H; y=1\cdots W$$

where, $$m_x = \left|\left\{\left(x+\frac{H}{2}\right) \bmod H\right\} - \frac{H}{2}\right|$$

-continued $$n_y = \left|\left\{\left(y+\frac{W}{2}\right) \bmod W\right\} - \frac{W}{2}\right|$$

The optimal offset ($t_x$, $t_y$) required to align $S_\theta^Q$ with $S_\theta^T$ is then determined as, $$(t'_x, t'_y) = \arg\max_{x,y}\{C_{TQ}(x,y)\} \quad (7)$$

$$t_x = \begin{cases} t'_x & \text{if } t'_s < \frac{H}{2} \\ t'_x - H & \text{if } t'_x \geq \frac{H}{2} \end{cases} \quad (8)$$

$$t_y = \begin{cases} t'_y & \text{if } t'_y < \frac{W}{2} \\ t'_y - W & \text{if } t'_y \geq \frac{W}{2} \end{cases} \quad (9)$$

Equations (8) and (9) are used to decide if the offsets are negative or positive.

At this optimal offset, the query and template fingerprint images are aligned (step 912) and the Euclidean distance between corresponding non-zero foreground elements in $S^{\theta Q}$ and $S_\theta^T$ is computed. This distance is treated as the matching score between the query print, Q and the template, T (step 914). Based on the matching score and the pre-specified threshold (step 916), the query image is said to have matched successfully (step 918) or unsuccessfully (step 920) with the template.

The above method does not account for the rotational offset between the query and the template feature maps. To account for rotational offsets, various rotated versions of the template ridge feature map may be correlated with the query feature map, and the optimal alignment computed. Alternately, FFT-based registration techniques (such as the Fourier-Mellin transform) may be employed.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method for matching fingerprint images, the method comprising the steps of:
   acquiring a query image of a fingerprint;
   extracting a minutiae set from the query image;
   comparing the minutiae set of the query image with a minutiae set of at least one template image to determine transformation parameters to align the query image to the at least one template image and to determine a minutiae matching score;
   filtering the query image with a plurality of filters, wherein a filtered query image results from each of the plurality of filters;
   square tessellating each of the filtered query images into a plurality of cells;
   measuring a variance of pixel intensities in each of the plurality of cells to determine a feature vector for each filtered query image;

combining the feature vectors of each of the filtered query images wherein a ridge feature map of the query image is constructed;

comparing the ridge feature map of the query image to a ridge feature map of the at least one template image to determine a ridge feature matching score; and combining the minutiae matching score with the ridge feature matching score resulting in an overall score, the overall score being compared to a threshold to determine if the query image and the at least one template image match.

2. The method as in claim 1, further comprising the step of enhancing the acquired query image.

3. The method as in claim 1, further comprising the step of segmenting foreground information from background information of the acquired query image.

4. The method as in claim 1, wherein the plurality of filters are tuned to a frequency corresponding to an average inter-ridge spacing in the query image.

5. The method as in claim 1, wherein a size of each of the plurality of cells is determined to be about a width of two ridges of the fingerprint image.

6. The method as in claim 1, wherein the comparing the minutiae sets step comprises the step of generating a correspondence map pairing minutiae points from the query set and the at least one template set.

7. The method as in claim 1, wherein the ridge feature matching score is a sum of feature vector distances in corresponding tessellated cells.

8. The method as in claim 1, wherein the plurality of filters are rotated by the transformation parameters.

9. The method as in claim 1, wherein the at least one template image includes a plurality of template images and an overall matching score is determined for each of the plurality of template images.

10. The method as in claim 9, further comprising the step of determining a template image with the highest overall matching score, the highest matching score template image being a closest match to the query image.

11. A computer readable medium storing a computer program of instructions, executable by a computer to perform method steps for matching fingerprint images, the method comprising the steps of:

acquiring a query image of a fingerprint;

extracting a minutiae set from the query image;

comparing the minutiae set of the query image with a minutiae set of at least one template image to determine transformation parameters to align the query image to the at least one template image and to determine a minutiae matching score;

filtering the query image with a plurality of filters, wherein a filtered query image results from each of the plurality of filters;

square tessellating each of the filtered query images into a plurality of cells;

measuring a variance of pixel intensities in each of the plurality of cells to determine a feature vector for each filtered query image;

combining the feature vectors of each of the filtered query images wherein a ridge feature map of the query image is constructed;

comparing the ridge feature map of the query image to a ridge feature map of the at least one template image to determine a ridge feature matching score; and combining the minutiae matching score with the ridge feature matching score resulting in an overall score, the overall score being compared to a threshold to determine if the query image and the at least one template image match.

12. The computer readable medium as in claim 11, wherein the plurality of filters are tuned to a frequency corresponding to an average inter-ridge spacing in the query image.

13. The computer readable medium as in claim 11, wherein a size of each of the plurality of cells is determined to be about a width of two ridges of the fingerprint image.

14. The computer readable medium as in claim 11, wherein the comparing the minutiae sets step comprises the step of generating a correspondence map pairing minutiae points from the query set and the at least one template set.

15. The computer readable medium as in claim 11, wherein the ridge feature matching score is a sum of feature vector distances in corresponding tessellated cells.

16. The computer readable medium as in claim 11, wherein the plurality of filters are rotated by the transformation parameters.

* * * * *